(12) United States Patent
Center

(10) Patent No.: US 6,318,670 B1
(45) Date of Patent: Nov. 20, 2001

(54) WATER WING FOR AIRPLANE FLOATS

(76) Inventor: Charles Center, HC33 Box 2950, Wasilla, AK (US) 99654

( * ) Notice: Subject to any disclaimer, the term of this patent is extended or adjusted under 35 U.S.C. 154(b) by 0 days.

(21) Appl. No.: 09/469,565

(22) Filed: Dec. 22, 1999

(51) Int. Cl.[7] .................................................. B64C 25/54
(52) U.S. Cl. ............................................ 244/105; 114/292
(58) Field of Search .............................. 244/100 A, 101, 244/105; 114/272, 283, 292

(56) References Cited

U.S. PATENT DOCUMENTS

| | | | | |
|---|---|---|---|---|
| D. 148,255 | * | 12/1947 | Salisbury ........................ | 244/101 X |
| 1,728,609 | * | 9/1929 | Holler .............................. | 114/292 X |
| 3,159,364 | * | 12/1964 | Sheaffer et al. ................. | 244/105 X |

* cited by examiner

*Primary Examiner*—Robert P. Swiatek
(74) *Attorney, Agent, or Firm*—Michael J. Tavella

(57) ABSTRACT

A small wing, located on the inside face of each float of a float airplane that causes the plane to go on step in ⅓ the space normally required. The wings are fixed in place on the floats. The wings enable a plane to take off on much smaller bodies of water. Conversely, the shorter step distance allows a plane to carry more weight than was possible before.

5 Claims, 5 Drawing Sheets

WATER WING FOR AIRPLANE FLOATS

CROSS REFERENCE TO RELATED APPLICATIONS Not Applicable

STATEMENT REGARDING FEDERALLY SPONSORED RESEARCH AND DEVELOPMENT Not Applicable

BACKGROUND OF THE INVENTION

1. Field of the invention

This invention relates to water wings for airplane floats and particularly to water wings for airplane floats that allow floats to go on-step faster.

2. Description of related art

Small airplanes with floats have been used for decades. These planes are able to land and take off from bodies of water, such as lakes. This ability gives people greater access to backcountry locations. Despite the benefits of floats, they do have some drawbacks. Most notably are the weight restrictions on loading float planes. Because these planes take off on water, they require a lot of room to gain speed. Moreover, excess weight may make it impossible to get the plane off the water in a reasonable space, if at all. The problem centers on the floats themselves. They sit in the water until the plane gets enough speed to go "on step". Once on step, the drag of the water on the floats is greatly reduced, allowing the plane to gain speed for takeoff.

Although some planes have been built for amphibious use, and some embody some type of water wing system, none has used such a wing on a typical float structure.

BRIEF SUMMARY OF THE INVENTION

The instant invention overcomes these problems. It uses a small wing, located on the inside face of each float. The wings are fixed in place and cause the plane to go on step in ⅓ the space normally required. This enables a plane to take off on much smaller bodies of water. Conversely, the shorter step distance allows a plane to carry more weight than was possible before.

DETAILED DESCRIPTION OF THE INVENTION

Figure 1:
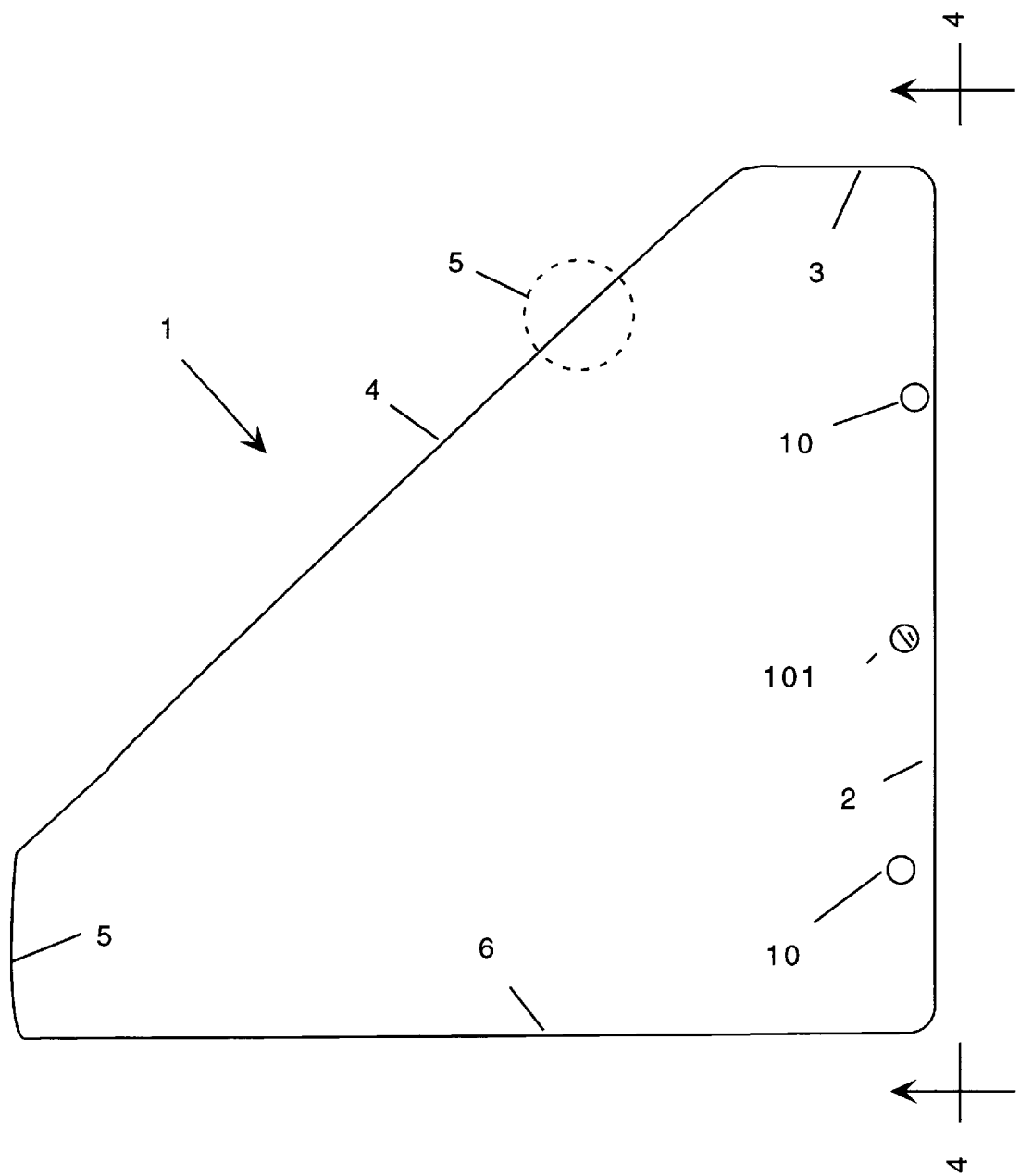
FIG. 1 is a top view of the invention.
Figure 6:
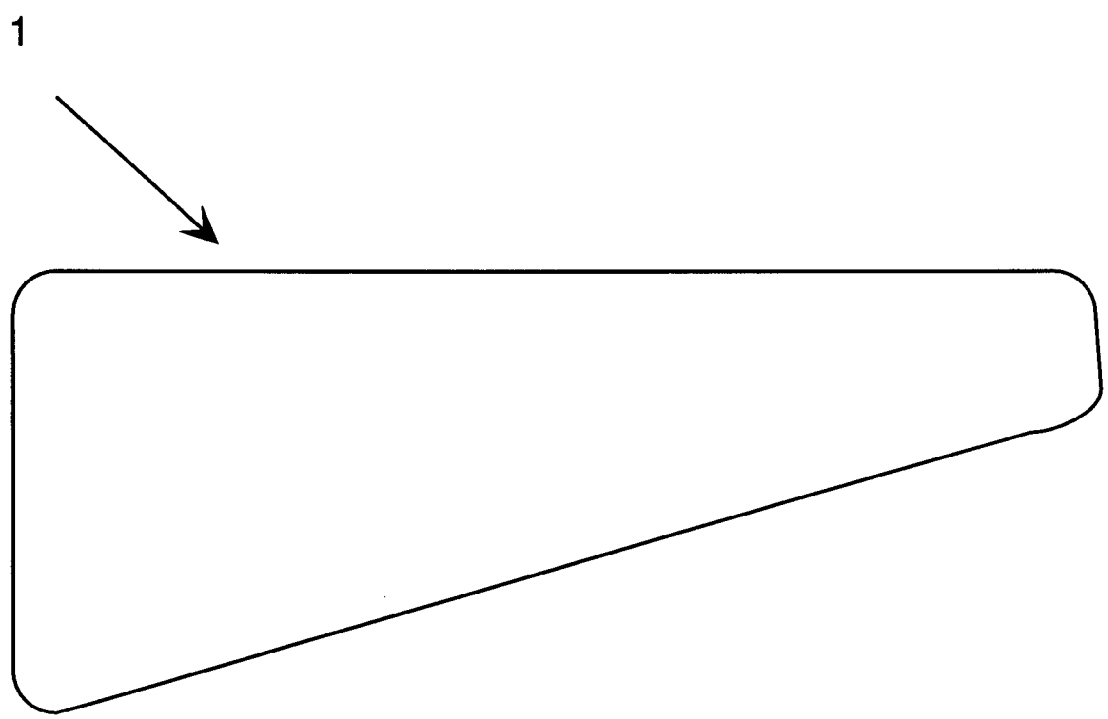
FIG. 6 is a top view of a second wing shape.

Referring now to FIG. 1, a top view of the preferred embodiment of the water wing is shown. This wing 1 has a long inner edge 2, a short front edge 3, a long, angled transition edge 4, a short outer edge 5 and a rear edge 6. The inner edge 2 has a number of holes 10, used to secure the wing 1 to a float 100 using fasteners such as rivets 101 or similar hardware. Although this shape is preferred, the wing 1 can take other forms. FIG. 6 shows another basic shape for the wing. The wing shape is less important than the placement of the wing 1 on the floats.

Figure 2:
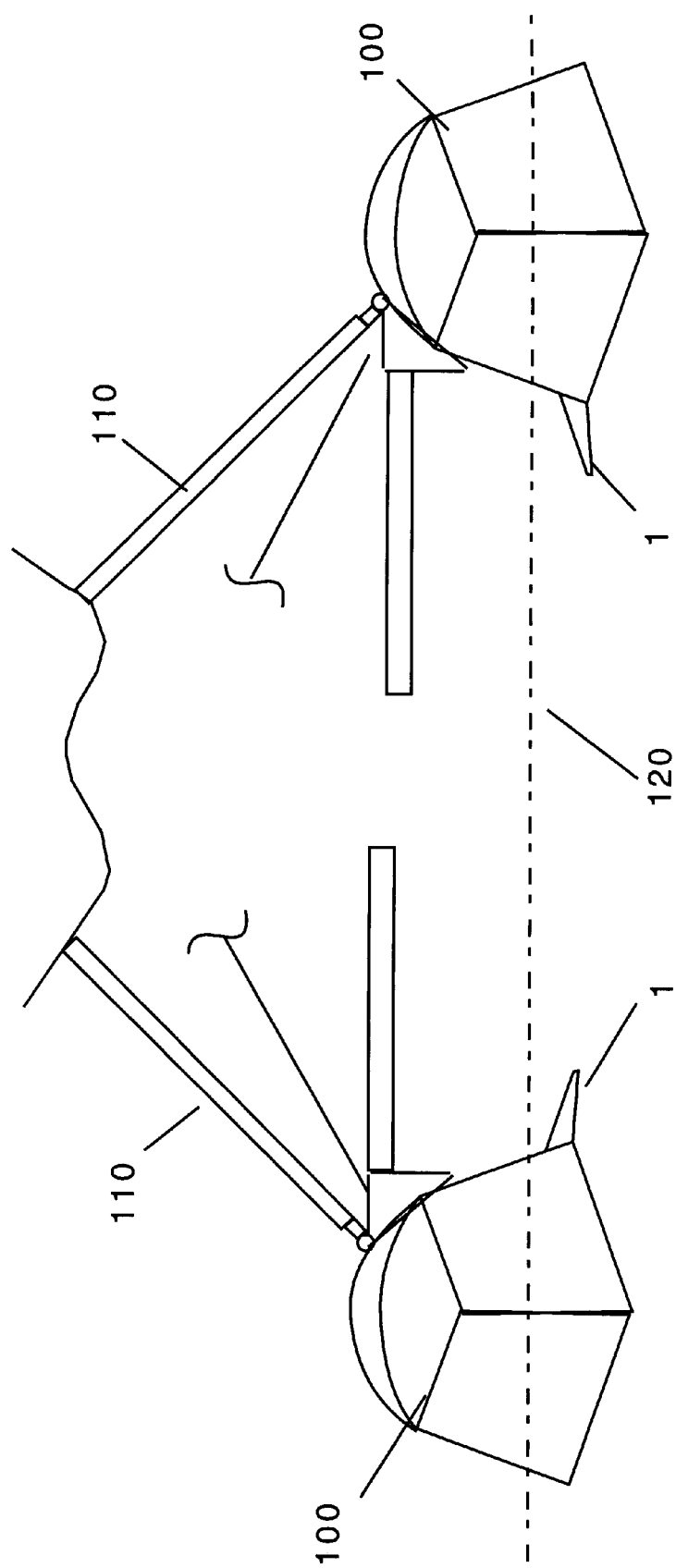
FIG. 2 is a front detail view of the invention mounted on a set of airplane floats.

FIG. 2 shows the wing 1 installed on airplane floats 100. Typically, small airplanes have a pair of floats 100 installed. The figure shows the floats 100 with a portion of the attachment struts 110. As shown, the floats are symmetrical. The wings 1 are attached to the inside of the floats 100 as shown. They also point slightly downward as shown. This figure also helps show the relative size of the wings to the floats. The wings are small compared to the floats. In this way, the wings do not interfere with the flight characteristics of the plane in flight.

Figure 3:
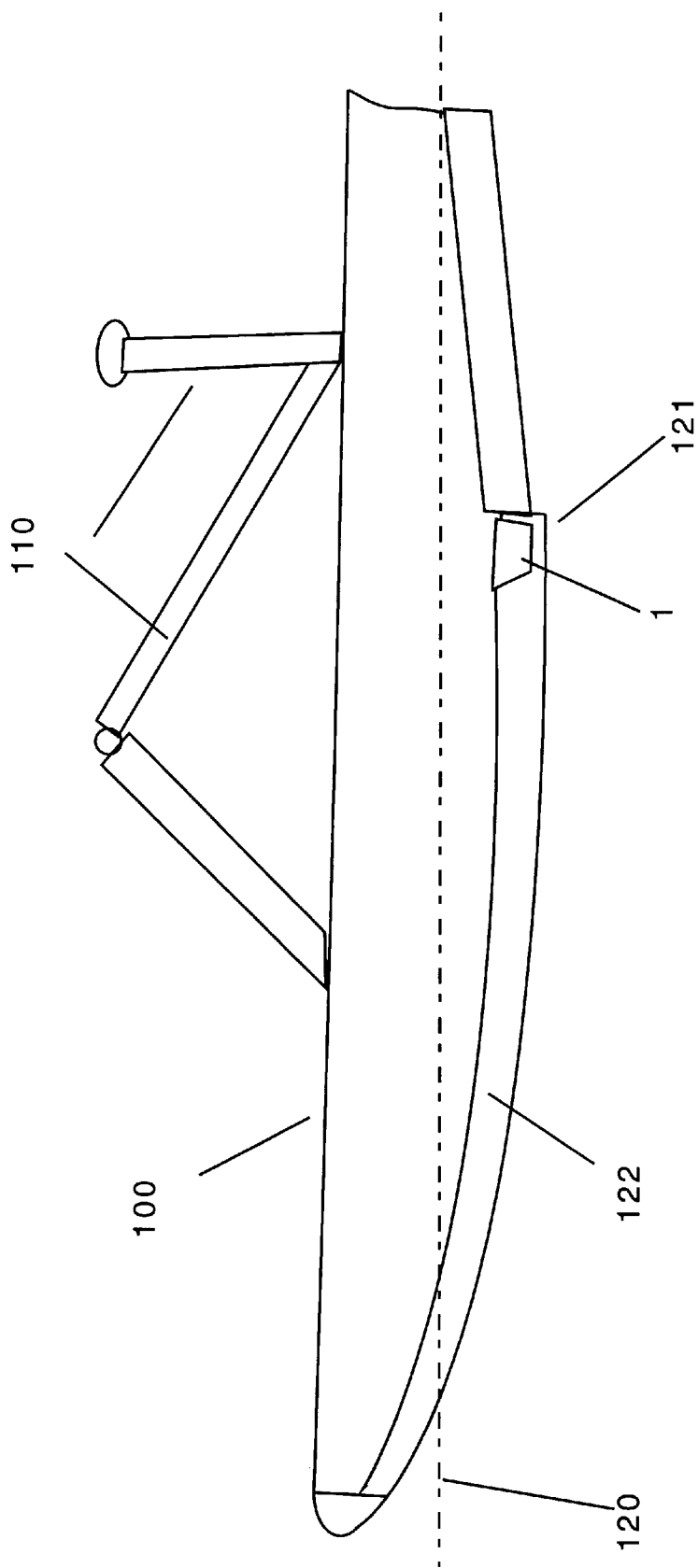
FIG. 3 is a side view of an airplane float with the device installed.

FIG. 3 shows the lateral placement of the wing 1 on a typical float 100. Placement of the wings is very important for proper operation of the wings during takeoff. The floats 100 have a waterline 120 as shown. The wings must be placed below this waterline. Moreover, the placement must be made at the rear 121 of the forward portion 122 of the float as shown. This area of the float is called the step. By placing the wings at this location, they enable the floats to go on step in about ⅓ of the normal distance required. Once the airplane is on step, the wings are out of the water. At this point, the plane is riding on the bottom surface of the floats.

Figure 4:
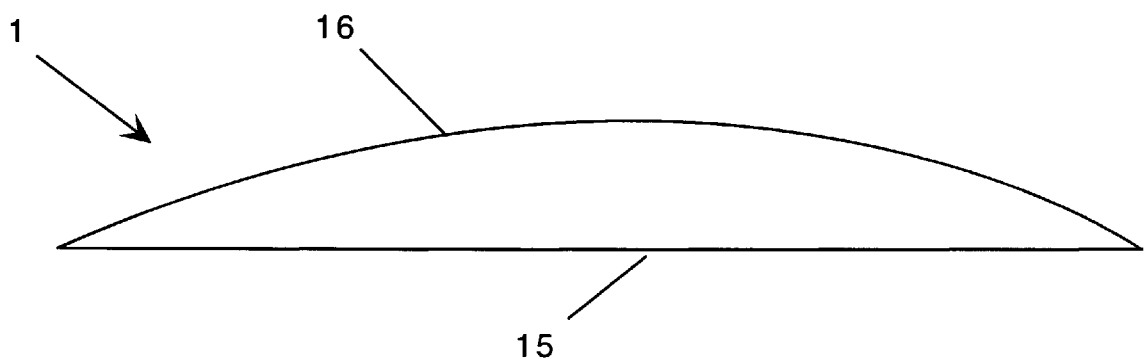
FIG. 4 is a cross-section of the wing taken along the lines 4—4 of FIG. 1.
Figure 5:
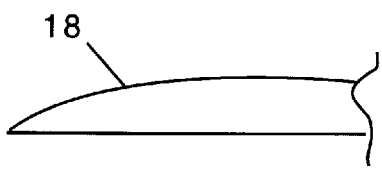
FIG. 5 is a detail view of the leading edge of the wing.

FIG. 4 is a cross-section of the wing 1. As shown, the wing has a flat bottom 15 and a curved upper surface 16. FIG. 5 shows the leading edge 18 of the wing 1. As shown, the leading edge is beveled to form a smooth curve.

The device is simply installed on a set of floats using rivets, nuts and bolts, welding, or other means known in the art. Once in place, the operation of the wings is automatic. There is no system for changing the pitch or angle of the floats. A pilot operates the plane in exactly the same manner as if the wings were not there. The only difference is that the plane can take-off in much less space than before.

In addition to enable the plane to go "on step" much faster, the wings also aid in making step turns at a slower speed. This increases safety in operating float planes.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device for improving take-off performance of a floatplane comprising:

a) a pair of floats, each of said pair of floats having an inside portion, each of said pair of floats also having a forward pontoon portion, the forward pontoon portion having a rear portion, and a waterline;

b) a wing, attached to the inside portion of each of said pair of floats; and c) wherein the wing is attached below the waterline of said forward pontoon portion of each of said pair of floats.

2. The device of claim 1 wherein said wing is attached to each of said pair of floats at the rear portion of the forward pontoon portion of each of said pair of floats.

3. The device of claim 1 wherein the wing has a curved upper surface.

4. The device of claim 1 wherein the wing has a shape and the shape of said wing includes:
   a) a long inner edge;
   b) a short front edge;
   c) a long, angled transition edge;
   d) a short outer edge; and
   e) a rear edge.

5. The device of claim 1 wherein the wing has a beveled leading edge.

* * * * *